United States Patent Office 3,157,372
Patented Nov. 17, 1964

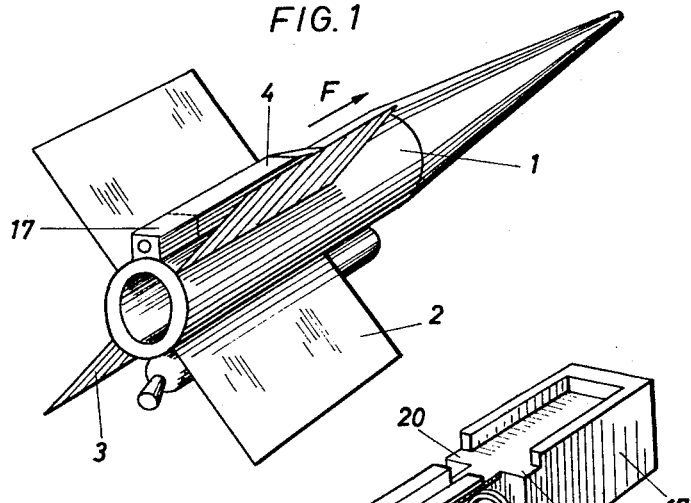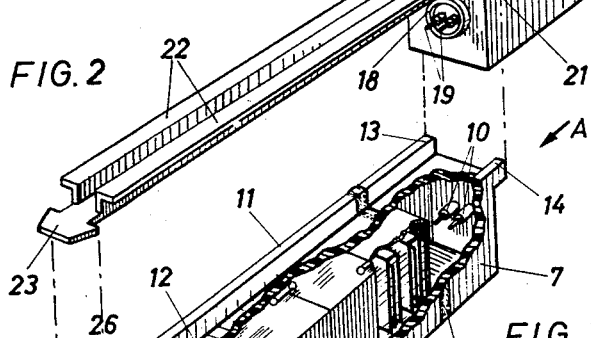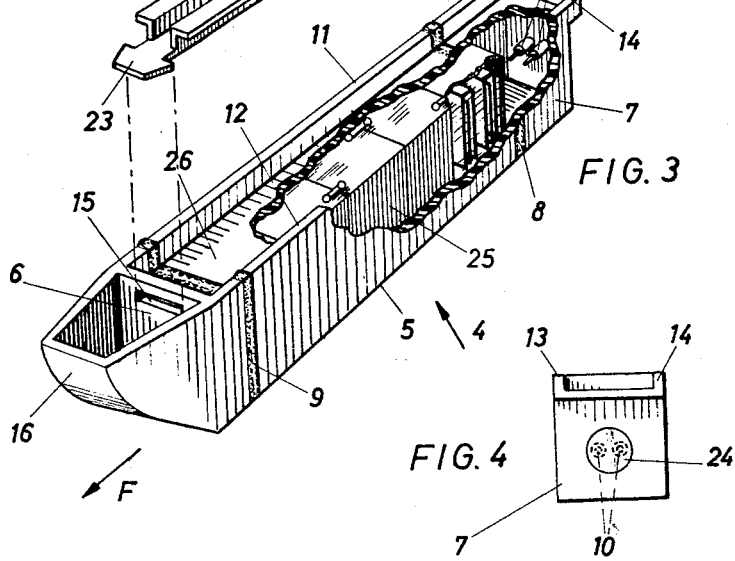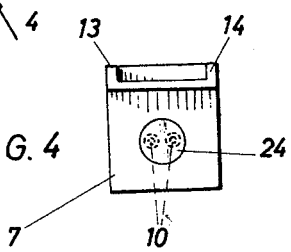

3,157,372
GUIDABLE FLYING BODIES
Peter Nauschütz, Munich, Erich Planitzer, Nurfingen, and Werner Schindler, Ottobrunn, near Munich, Germany, assignors to Bölkow-Entwicklungen Kommanditgesellschaft, Ottobrunn, near Munich, Germany, a corporation of Germany
Filed Dec. 15, 1959, Ser. No. 859,819
Claims priority, application Germany Dec. 16, 1958
6 Claims. (Cl. 244—14)

In guidable flying bodies, such as rockets or guided missiles, it is known to provide within the body itself cavities for the disposition of the current supply elements. As a result, the already limited space within this body is reduced still further. In addition, it is difficult to supervise the current supply elements because these elements are only accessible after disassembly of the flying body. In a case of urgency, however, delays in readying such guidable flying bodies could become disastrous. Such delays will occur especially when old and ineffective batteries are to be exchanged.

One of the objects of the invention, therefore, is to arrange the current supply elements on the outside of a flying body and in such a manner that they can be readily exchanged.

A further object of the invention is to provide a battery housing or enclosure in which the batteries for the current supply of the flying body are enclosed in an air-tight manner. In accordance with another object of the invention, before the flying body is readied for operation, the battery housing will be slid upon a guiding rail provided on the outside of the flying body. Thus, only a few seconds will be required to connect the battery housing with the flying body.

Still another object of the invention is to insure that the batteries are not deteriorated or destroyed in their effectiveness by humidity.

These and other objects of the invention will be more fully apparent from the drawing annexed herewith in which FIG. 1 represents in perspective a guidable flying body embodying certain features of the invention;

FIG. 2 shows, at an enlarged scale and also in perspective, a casing containing the illuminating set of a rocket and a guiding rail for attaching a battery housing to the rocket;

FIG. 3, also in perspective and at an enlarged scale, shows part of the inside of the battery housing illustrated; and FIG. 4 shows, in elevation and in cross section, a front view of a housing containing the battery.

As apparent from FIG. 1, a guidable flying body 1 is provided with a battery housing or enclosure 4 which is arranged between its stabilizing flaps 2 and 3 and detachably attached thereto.

Battery housing 4, as apparent from FIG. 3, consists of a preferably rectangular center portion 5 made of plastic and of two relatively short cover parts 6 and 7 connected to center portion 5 along welds 8, 9 in an air and humidity-tight manner. In the front wall of cover part 7 there are arranged a pair of electrical sockets 10. The side walls of battery housing 4 are somewhat higher than the batteries themselves, forming extensions 11 and 12 which, together with the surface of battery housing 4, form a channel 26 of U-shaped cross section. The ends of extensions 11 and 12 protrude from housing 4 at 13 and 14, and serve as supporting elements.

Cover part 6 is provided with a slot 15 and covered by a cap 16 which is streamlined in the direction of arrow F.

Flying body 1 has in an otherwise well-known manner (by welding, bolting, etc.) attached at its near end a casing 17 containing usually a tracer illumination set. The front surface of casing 17 facing the tip of flying body 1 carries a tightening ring 18 and an electrical plug 19. The bottom of casing 17 has recesses 20 and 21 fitting into projections 13, 14 of cover part 7. At the same time, projecting from casing 17 is a guiding rail 22 of U-shaped cross section and preferably also attached to body 1 in any known manner (by welding, bolting, etc.). Guiding rail 22 extends towards the tip of flying body 1 and its dimensions correspond to those of channel 26. The front end of guiding rail 22 has a latch 23 designed to fit into slot 15 of cover part 6. As apparent from FIG. 4, sockets 10 are closed in an air and humidity-tight manner by means of a piece of foil 24 which is glued to the other front surface of cover part 7. As apparent from FIG. 3, center portion 5 of battery housing or enclosure 4 contains batteries 25 having minus and plus poles, respectively, connected to sockets 10. After mounting of batteries 25, cover parts 6 and 7 are welded to portion 5 to form an absolutely tight closure.

When the flying body is to be readied for operation, battery housing 4 is slid onto guiding rail 22 until supporting prongs 13 and 14 engage and fit into the recesses 20 and 21 of casing 17, and latch 23 falls into slot 15. In this way the battery housing is held by the guiding rail and cannot any more detach itself therefrom. If required, however, for example, because the flying body need not be ready any more or because the battery housing is to be exchanged, battery housing 4 can be removed from guiding rail 22; this can be effected by means of a forceful movement or jerk in the direction of arrow F whereby latch 23 will again be taken out from slot 15.

During the sliding of the battery housing 4 onto the guiding rail 22, the foil piece 24 will be perforated by plug 19 entering the socket 10 and providing electrical connection between batteries 25 and the current supply elements of the flying body, for example, the supply elements, or the control organs for triggering the spark, etc.

We claim:

1. In combination, an oblong guidable flying body having attached thereon at its outside a projection substantially perpendicular to said body, mechanical guiding means and first electrical connecting means extending from said projection in a direction parallel to said body, and an elongated battery enclosure having at one end second electrical connecting means, and along its outer surface an elongated recess slidably fitting over said guiding means in said parallel direction so as to permit said enclosure to be slid on said guiding means thereby electrically connecting said first and said second electrical connecting means.

2. Combination according to claim 1, wherein said flying body consists of a cigar shaped center portion having four wings extending therefrom diametrically perpendicular to each other, said projection being arranged on the top of said center portion between adjacent wings, and wherein said mechanical guiding means and said first electrical connecting means extend from said projection in the flight direction of said body.

3. Combination according to claim 1, further comprising means operative when said enclosure arrives at its end position to lock said guiding means in said recess in said end position in such a way as to prevent said enclosure from removing itself from said guiding means.

4. Combination according to claim 1, wherein said guiding means consist of a U-shaped guiding rail and wherein said enclosure has a U-shaped recess slidingly fitting over said guiding rail, and wherein said guiding rail at its front end is provided with a latch and said U-shaped recess is provided at its end with a slot to receive said latch to lock said enclosure to said body after it has been slid onto said guiding rail and after the electrical connections have been made.

5. Combination according to claim 1, wherein said second electrical connecting means are of the female type and have attached thereon a foil which is perforated by said first electrical connecting means under control of the sliding movement when said enclosure arrives at a certain position.

6. Combination according to claim 1, wherein said enclosure consists of an elongated center part of a substantially rectangular cross section and of two end parts which are attached to said center part, one of which carries the electric connection and the other part being formed in a streamlined manner.

References Cited in the file of this patent

UNITED STATES PATENTS

| | | |
|---|---|---|
| 2,396,534 | Rose | Mar. 12, 1946 |
| 2,472,947 | Hlobil | June 14, 1949 |
| 2,476,302 | Jeppson | July 19, 1949 |
| 2,731,586 | Born | Jan. 17, 1956 |
| 2,779,282 | Raffel | Jan. 29, 1957 |